United States Patent [19]

Swick

[11] Patent Number: 4,493,716
[45] Date of Patent: Jan. 15, 1985

[54] APPARATUS FOR THE SEPARATION OF HYDROGEN SULFIDE FROM A GAS MIXTURE

[75] Inventor: Robert H. Swick, Newcastle, Del.

[73] Assignee: W. L. Gore & Associates, Inc., Newark, Del.

[21] Appl. No.: 433,889

[22] Filed: Oct. 12, 1982

[51] Int. Cl.³ .............................................. B01D 53/22
[52] U.S. Cl. .......................................... 55/158; 55/16; 55/73
[58] Field of Search ............................ 55/16, 73, 158; 428/252, 265, 269

[56] References Cited

U.S. PATENT DOCUMENTS

| | | | |
|---|---|---|---|
| 3,534,528 | 10/1970 | Porter | 55/16 |
| 3,651,618 | 3/1972 | Klein et al. | 55/16 |
| 3,735,559 | 5/1973 | Salemme | 55/16 |
| 3,770,842 | 11/1973 | Steigelmann et al. | 55/16 X |
| 3,780,496 | 12/1973 | Ward et al. | 55/16 |
| 3,865,890 | 2/1975 | Steigelmann et al. | 55/16 |
| 3,980,456 | 9/1976 | Browall | 55/158 |
| 4,060,566 | 11/1977 | Yahnke | 55/158 X |
| 4,089,653 | 5/1978 | Ward | 55/158 X |
| 4,130,403 | 12/1978 | Cooley et al. | 55/16 |
| 4,134,742 | 1/1979 | Schell | 55/16 |
| 4,181,675 | 1/1980 | Makin et al. | 55/16 X |
| 4,194,041 | 3/1980 | Gore et al. | 428/252 |
| 4,208,194 | 6/1980 | Nelson | 55/158 |
| 4,230,463 | 10/1980 | Henis et al. | 55/16 |
| 4,239,793 | 12/1980 | Matsuura et al. | 55/16 X |
| 4,243,701 | 1/1981 | Riley et al. | 55/158 X |
| 4,255,591 | 3/1981 | Makin et al. | 55/16 X |
| 4,367,135 | 1/1983 | Posey, Jr. | 55/16 X |
| 4,370,150 | 1/1983 | Fenstermaker | 55/16 |
| 4,397,661 | 8/1983 | King et al. | 55/158 |

FOREIGN PATENT DOCUMENTS 1062176  9/1979  Canada .

OTHER PUBLICATIONS

Ward, III et al., "Ultrathin Silicone/Polycarbonate Membranes for Gas Separation Processes", 1 J. Membrane Sci. 99–108 (1976).

Stannett, "The Transport of Gases in Synthetic Polymeric Membranes: An Historic Perspective", 3 J. Membrane Sci. 97–115 (1978).

Thiokol Corporation, LP Polysulfide Polymer (Jun. 1979).

Primary Examiner—Robert Spitzer
Attorney, Agent, or Firm—Finnegan, Henderson, Farabow, Garrett and Dunner

[57] ABSTRACT

A flexible layered membrane comprising a chemically inert microporous support layer coated on one surface with a thin continuous selective permeability pellicle of cured polysulfide polymer having a separation factor favoring hydrogen sulfide. The resulting article is suitable for removing hydrogen sulfide from a mixture of gases.

15 Claims, 2 Drawing Figures

APPARATUS FOR THE SEPARATION OF HYDROGEN SULFIDE FROM A GAS MIXTURE

BACKGROUND OF THE INVENTION

A. Field of the Invention

This invention relates to the separation of hydrogen sulfide from a mixture of gases which could include methane, and, more particularly, to multi-component membranes for separating hydrogen sulfide from gaseous mixtures, and to processes and apparatus for separating hydrogen sulfide from gaseous mixtures by permeation utilizing such multi-component membranes.

B. Background Art

The use of semi-permeable membranes for reverse osmosis or ultra filtration processes is well known. For example, in a reverse osmosis process, high pressure saline water is placed in contact with a semi-permeable membrane permeable to water but relatively impermeable to salt in order to separate concentrated brine and relatively pure water, the water then being available for personal use such as drinking, cooking, and cleaning.

It has now been discovered that certain membranes may also be employed for the separation of various specific gases. The separation of a gas mixture utilizing a membrane is effected by passing a feed stream of a gas mixture across a surface of the membrane at an elevated pressure relative to an effluent stream emerging from the other surface thereof. Any component of the mixture which is more permeable than the other gases thereof will pass through the membrane at a more rapid rate than the less permeable components. Therefore, the permeate stream which emerges from the membrane is enriched in the more permeable component while, conversely, the residue stream is enriched in the less permeable components of the feed gas mixture. Thus, selective separation can provide preferential depletion or concentration of one or more desired gases in a mixture.

This invention is particularly concerned with a membrane which is more permeable to hydrogen sulfide than to other gases with which it might normally be mixed. Through the use of the membrane of the present invention, the permeate stream passing through the membrane exhibits an enriched concentration of hydrogen sulfide in relation to the feed stream of gases, while the residue of the feed stream exhibits a decreased concentration of hydrogen sulfide gas.

Many possible uses of such a membrane are conceivable. Reduction of air pollution makes it essential to minimize the release of sulphur dioxide into the atmosphere. By removing hydrogen sulfide from coal gas utilized in combustion processes, oxidation of the hydrogen sulfide into sulphur dioxide is avoided. Moreover, in many commercial enterprises, the waste gas from hydrogen sulfide removal is converted into sulphur in a process the cost of which is inversely dependent upon the concentration of hydrogen sulfide supplied. As an overall effect, therefore, removing hydrogen sulfide prior to combustion of coal gas not only will reduce air pollution resulting from that combustion, but can, through concentration of the hydrogen sulfide stream, result in lowering the cost of processing waste gases.

Furthermore, natural gas contains various percentages of hydrogen sulfide. To be commercially acceptable, however, the hydrogen sulfide content of natural gas must be reduced to concentrations of no more than one quarter to one half grain per one hundred standard cubic feet, so as to minimize the risk of hydrogen sulfide corrosion of valves and fittings in natural gas distribution systems.

Hydrogen sulfide may be removed from hydrocarbon gas streams such as natural gas by many methods. These methods may be broadly classified as chemical reaction, physical absorption, and adsorption. Chemical reaction processes rely on reversible chemical reactions and use an absorbant which reacts with hydrogen sulfide in a contactor. The absorbant can be regenerated by use of a high temperature stripper. The reversal of some chemical reaction processes is so difficult that cost prohibits regeneration, and hydrogen sulfide is removed in a precipitation process which consumes the absorbant, usually a heavy metal chloride or nitrate. The physical absorption processes utilize the affinity of certain chemicals for hydrogen sulfide and basically employ a contactor to remove acid gas from the feedstream. Also, a stripper is used to separate the acid gas from the absorbent. The adsorption processes are based on the unique adsorbant qualities of certain minerals such as zeolites. Generally, these adsorption processes are of a batch-type employing a molecular sieve. In operation the acid gas components of the feed gas stream are adsorbed on the surface of the mineral used and are subsequently removed therefrom during a high temperature regeneration cycle.

All of the above-mentioned processes are not particularly attractive when evaluated using commercial parameters such as cost, energy consumption, plant area requirements, operation manpower requirements, and maintenance costs. These processes become more uneconomical for treating sour natural gas as the cost of the processes, evaluated with the above paramaters continue to increase. For example, on the north slope of Alaska and on offshore platforms, the area available for process systems is extremely expensive and, hence, it follows that systems used at these locations must have small area requirements.

Furthermore, it is well-known by those in the art that these processes are energy-intensive. Molecular sieves, for example, must be heated to and held at approximately 600° Fahrenheit during regeneration in order to remove all of the adsorbed materials from the mineral surfaces. High energy input is required to achieve such temperatures. An additional disadvantage of the above-mentioned methods is that they quite frequently require interruption of the separation process to permit regeneration and/or replacement of the chemicals involved; therefore, truly continuous flow-through separation processes are not available.

However, other processes have been used to separate one or more gaseous components from a gaseous mixture. In particular, membranes have been used for many years in gas permeation separation methods. Gas permeation may be defined as a physical phenomenon in which certain components selectively pass through a substance such as a membrane. Basically, a gas permeation process involves introducing a gas into one side of a chamber which is separated into two compartments by a permeable membrane. The feed gas stream flows along the surface of the membrane and its more permeable components pass through the membrane barrier at a higher rate than those of lower permeability. After contacting the membrane, the depleted feed gas residue stream is removed through a suitable outlet on the feed compartment side of the vessel. The other side of the membrane, the permeate side, is provided with a suitable outlet through which the permeate gaseous components can be removed.

The purpose of a membrane in a gas permeation process is to act as a selective barrier, that is, to permit passage of some but not all components of the gaseous feed stream. Generally, in gaseous membrane separation processes, the separation is due to molecular interaction between gaseous components of the feed stream and the membrane. Because different gaseous components react differently with the membrane, the transmission rates are different for each gas. Hence, separation of different components can be effected by single or repeated diffusions through a given selective membrane.

To date the selection of suitable components for use in a gas separation membrane is largely a matter of intuition.

Accordingly, one object of the present invention is the production of a membrane suitable for use in a continuous flowthrough process for extracting hydrogen sulfide from a mixture of gases.

Another object of the present invention is a selective gas permeation membrane which favors hydrogen sulfide diffusion and is possessed of durable construction and capable of being manufactured with ease from readily available components.

Additional objects and advantages of the invention will be set forth in a description which follows, and in part will be obvious from the description, or may be learned by the practice of the invention. The objects and advantages of the invention may be realized and obtained by means of the instruments and combinations particularly pointed out in the appended claims.

SUMMARY OF THE INVENTION

To achieve the foregoing objects, and in accordance with the invention as embodied and broadly described herein, a flexible layered membrane for use in separating hydrogen sulfide from a mixture of gases in a continuous flow-through process is provided comprising a fine-textured support layer permeable at least to hydrogen sulfide and having pores occludable by a very thin coating; and a selective permeability pellicle of cured polysulfide polymer having a separation factor favoring hydrogen sulfide adhered to a surface of said support layer and occluding the pores thereof. The selective permeability pellicle preferably comprises a polymer of bis-(ethylene oxy) methane containing disulfide linkages, and the support layer comprises a microporous substance.

In another preferred embodiment of the present invention, apparatus for removing hydrogen sulfide from a mixture of gases comprises a flexible layered membrane including a fine-textured support layer permeable at least to hydrogen sulfide gas and having pores occludable by a very thin coating, and a selective permeability pellicle of cured polysulfide polymer having a separation factor favoring hydrogen sulfide adhered to a surface of the support layer occluding the pores thereof; means for conducting the mixture of gases under pressure along one surface of the layered membrane; and means for removing gases emerging from the surface of the layered membrane opposite the one surface thereof. Preferably the conducting means introduces the mixture of gases along a surface of the selective permeability pellicle and the removing means draws off gases emerging from the fine-textured support layer.

The membrane and apparatus of the present invention are particularly directed to removing hydrogen sulfide from a mixture of gas which includes methane by the means and structure described herein.

BRIEF DESCRIPTION OF THE DRAWINGS

The invention will be described with additional specificity and detail through the use of the accompanying diagrams in which.

DESCRIPTION OF THE PREFERRED EMBODIMENTS

Figure 1:
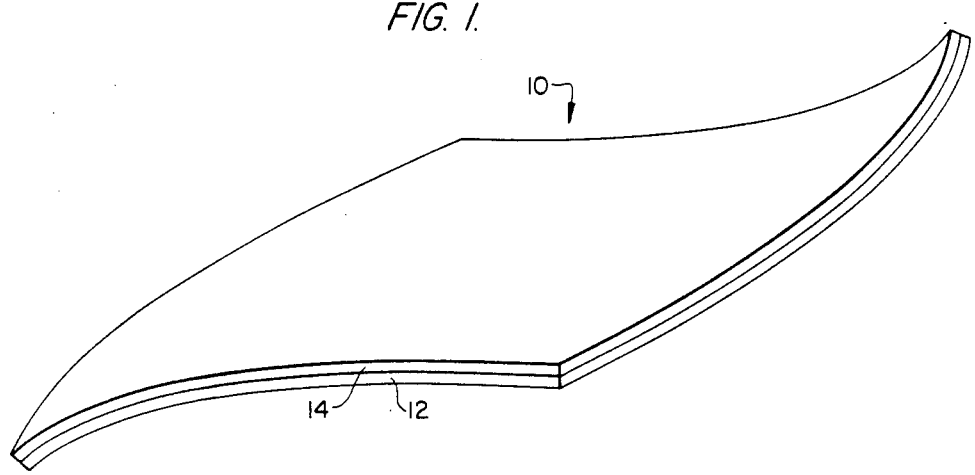
FIG. 1 is a perspective view of a flexible membrane incorporating the teaching of the present invention.

Referring to FIG. 1, a two-layered flexible membrane 10 used in separating hydrogen sulfide from a mixture of gases comprises a support layer 12 and a selective permeability pellicle 14 adhered to a surface thereof. Support layer 12 is composed of a fine-textured, mechanically and chemically stable material permeable at least to hydrogen sulfide and should be of such porosity as to be capable of accepting continuous coatings of other materials that are very thin but nonetheless occlude the pores thereof. The more microporous the material of support layer 12, the thinner may be the coating received thereon for functioning as selective permeability pellicle 14. A very thin coating upon support layer 12 is desirable in that the thinner composite flexible membrane 10, the more permeable it will be to any gas, but particularly to hydrogen sulfide. In turn, increased permeability will result in a reduced membrane area or pressure differential required for permeation of a given quantity of gas.

It has been found advantageous in the context of the present invention to employ as support layer 12 highly crystalline films of expanded polytetrafluoroethylene such as that marketed by W. L. Gore and Associates Inc. under the trade name GORE-TEX ®. These films consist of sheets of fibers in two-dimensional orthogonal arrays connected at nodes of the same material, which nodes are not apparently fibrous. GORE-TEX ® film is readily permeable to all gases because of its open structure, and is capable of occluded coating by a thin layer of another substance as has been demonstrated in U.S. Pat. No. 4,194,041 wherein it is disclosed to coat GORE-TEX ® with polyurethane to produce a waterproof but breathable laminate. Additionally, it is proposed that a microporous polypropylene film such as that sold by Celanese Plastics Co. under the trade name Celgard ® could suitably function as support layer 12.

As substances from which to form selective permeability pellicle 14, materials which readily absorb hydrogen sulfide were investigated. Materials suitable to the aims of the present invention have been located in the series of polysulfide polymers marketed by Thiokol Corporation under the trade name LP ®. Different polymers in the series are designated by a number following the trade designation, such as LP ®-2. Such polymers can be cured from liquid form at room temperature to solid rubber without shrinkage by use of a suitable curing agent, most commonly oxygen donating materials such as lead dioxide, calcium peroxide, cumene hydroperoxide, and p-quinone dioxime. Lower valence metallic oxides, other organic peroxides, metallic paint driers and aldehydes can also function as curatives. Chemically, the LP ® series of polysulfides are polymers of bis-(ethylene oxy) methane containing disulfide linkages. The polymer segments are terminated with reactive mercaptan (—SH) groups, and branched mercaptan groups are built into the polymer chains to control modulus and elongation. The general structure is:

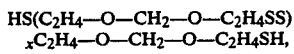
$$HS(C_2H_4-O-CH_2-O-C_2H_4SS)_xC_2H_4-O-CH_2-O-C_2H_4SH,$$

where x is an integer. Each polymer is supplied with a specific proportion of branch chains which contribute to the production of crosslinking when cured. Prior to curing, LP ®-2, LP12, and LP ®-32 have average molecular weights in the range of 3,000 to 5,000. On the other hand LP ®-31 in the same series has a corresponding weight of 7,000 to 9,000, while for LP ®-3 and LP ®-33 the figure is about 1,000.

In a gas separation process employing a permeable membrane of the present invention, a mixture of gases is brought into contact with one side of flexible membrane 10 and a sufficient positive pressure differential is maintained across membrane 10 such that the more permeable gas, hydrogen sulfide, is driven from the feed side of membrane 10 to the permeate side. The more permeable hydrogen sulfide passes through the membrane at a higher rate than do the other components of the feed mix which have lower permeabilities. The partial pressure of the hydrogen sulfide is maintained at a higher level on the feed side of membrane 10 than on the permeate side by separately removing the residue of the feed stream and the permeate stream from contact with membrane 10. Although in theory the desired effect may be obtained by supplying the feed stream gas to either side of the flexible membrane, it is likely that the mechanical integrity of the membrane will be enhanced throughout its operation if the positive feed stream is supplied to permeability pellicle side 14 of composite membrane 10, permitting the permeate hydrogen sulfide to emerge from fine-textured support layer side 12.

Figure 2:
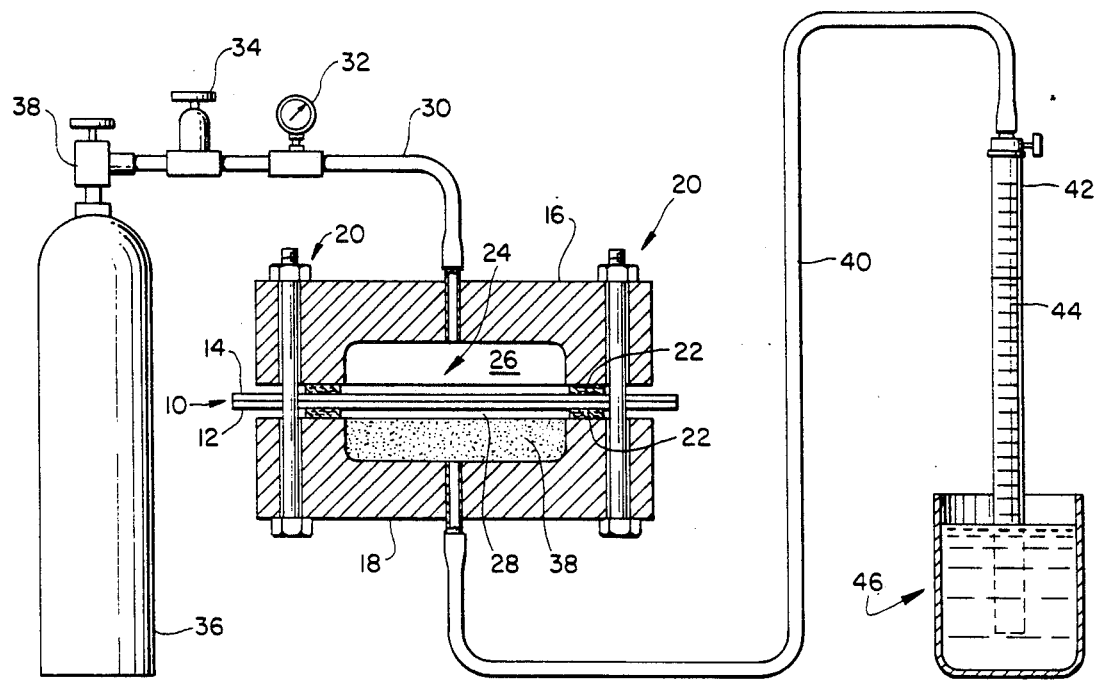
FIG. 2 is a schematic diagram of equipment arranged to test the permeability of various gases in relation to the membrane of FIG. 1.

In order for a separation membrane to function economically it is necessary that the permeability of the gas to be removed from a mixture of gases be several times greater than that of the other gases in the mixture. In order to measure the permeability of various gases in relation to membranes embodying the present invention, the apparatus as shown in FIG. 2, was employed. Flexible membrane 10 composed of fine-textured support layer 12 and selective permeability pellicle 14 attached to a surface thereof was secured in compression between steel flanges 16, 18 by cooperating nut and bolt assemblies 20. Gaskets 22 interposed between flanges 16, 18 and membrane 10 served to seal membrane 10 between flanges 16, 18 separating a void 24 between flanges 16, 18 into a feed chamber 26 and a permeate chamber 28. The lower portion of permeate chamber 28 was provided with a porous member 38 for mechanically supporting membrane 10 when gases under pressure were contained in receiving chamber 26.

Means were provided for conducting selected gases or mixtures of gases under pressure to one surface of membrane 10. Feed chamber 26 was connected by suitable piping 30 through a pressure gauge 32, a pressure regulator 34, and a valve 38 to a source of pressurized gas 36. In addition, means were provided for removing gas emerging from the side of membrane 10 opposite from the conducting means. Permeate chamber 28 was connected by suitable piping 40 to an inverted burette 42 containing a column of liquid 44 and standing in a reservoir 46. For a number of gases supplied for specified durations and pressures to receiving chamber 26, the displacement of water column 44 in burette 42 was measured and taken as an indication of the volume of the gas supplied to receiving chamber 26 which had permeated through membrane 10. From this information the permeability of the membrane being utilized was calculated by known means.

A number of examples employing different LP ® polymers were fabricated and tested. For a support layer, a piece of GORE-TEX ® expanded polytetrafluoroethylene film, about 8 inches square, was secured about the periphery thereof to a flat surface. A small quantity of the appropriate viscous liquid LP ® polymer was poured into a line on the support layer and drawn into a thin film using a film applicator. The applicator consisted of a knife edge supported by blocks at the ends thereof, in such a manner that the knife edge was 0.001 inches above the surface of the support layer. The polymer was allowed to cure into a thin selective permeability pellicle which measured 20.5 μm (0.00081 in.) in thickness.

The resulting flexible layered membrane was bolted in the test apparatus of FIG. 2 so as to preclude gas leakage out of chambers 26, 28 to the surrounding atmosphere. Through the use of nitrogen as test gas 36, it was verified that selective permeability pellicle 14 was free of pinholes. Nitrogen was used because it is considered to have a very low permeability and any permeation apparent could be considered to represent leakage. Pellicles exhibiting leakage were accordingly discarded. Thereafter application of various test gases yielded the specific individual permeabilities below for a membrane, such as membrane 10, constructed using different LP ® polymers.

EXAMPLE 1

A membrane 10 was constructed using LP ®-31, which has a molecular weight before curing in the range of 7,000 to 9,000.

| GAS | PERMEABILITY $\frac{cm^3 \cdot mm}{cm^2 \cdot sec \cdot cmHg}$ |
|---|---|
| Hydrogen Sulfide (H$_2$S) | $1.08 \times 10^{-7}$ |
| Carbon Dioxide (CO$_2$) | $0.17 \times 10^{-7}$ |
| Methane (CH$_4$) | $<0.1 \times 10^{-7}$ |

EXAMPLE 2

A membrane 10 was constructed using LP ®-2, which has a molecular weight before curing in the range of 3,000 to 5,000.

| GAS | PERMEABILITY $\frac{cm^3 \cdot mm}{cm^2 \cdot sec \cdot cmHg}$ |
|---|---|
| Hydrogen Sulfide (H$_2$S) | $4.21 \times 10^{-7}$ |
| Carbon Dioxide (CO$_2$) before contact of membrane with H$^2$S | $0.24 \times 10^{-7}$ |
| Carbon Dioxide (CO$^2$) after contact of membrane with H$^2$S | $0.64 \times 10^{-7}$ |
| Methane (CH$_4$) | $<0.1 \times 10^{-7}$ |

It should be noted that the figures above indicate that the permeability of carbon dioxide through a membrane 10 made with LP®-2 increases after the membrane is exposed to hydrogen sulfide. It is not unexpected that any material dissolved in a membrane could change the permeability of that membrane in relation to a given gas, but the increased permeability of the membrane 10 of Example 2 above to carbon dioxide in the presence of a hydrogen sulfide permeate may have particular significance in sweetening natural gas. While hydrogen sulfide is one impurity which must be removed from natural gas before its transport through a pipeline, carbon dioxide levels therein must also be reduced, for example to less than 2% from levels of perhaps 10%. A membrane which is permeable to hydrogen sulfide and when once exposed thereto is increasingly permeable to carbon dioxide could prove especially valuable in the processing of natural gas.

EXAMPLE 3

A membrane 10 was constructed using LP®-3, which has a molecular weight before curing of approximately 1,000.

| GAS | PERMEABILITY $\frac{cm^3 \cdot mm}{cm^2 \cdot sec \cdot cmHg}$ |
|---|---|
| Hydrogen Sulfide ($H_2S$) | $1.92 \times 10^{-7}$ |
| Carbon Dioxide ($CO_2$) | $0.51 \times 10^{-7}$ |
| Methane ($CH_4$) | $<0.1 \times 10^{-7}$ |

Of striking significance in these tests was the discovery that the permeability of the membranes tested to hydrogen sulfide was at least ten times, and in the case of LP®-2 more than thirty times, the permeability in relation to methane, indicating the test membrane involved to be imminently suitable in a continuous flow-through process for sweetening methane of sour gases.

While these initial results might lead to the hasty conclusion that LP®-2 is preferred for the purposes of the present invention, the inventor wishes to point out that pellicle fabrication is yet a relatively new technology about which much remains to be understood. It is entirely possible that under more advanced manufacturing techniques a different, or an as yet untested, LP® polymer will produce superior results to those shown above for LP®-2. Although the theoretical mechanism of pellicle functioning is also as yet uncertain, the inventor speculates that the crosslinking in the LP® polymers arising upon cure accounts for their effectiveness as coatings in hydrogen sulfide separation membranes. If this theory proves accurate, it is then projected that LP® polymers of low molecular weight, such as LP®-3, might ultimately produce the best results.

It will be apparent to those skilled in the art that modifications and variations can be made in the apparatus of this invention. The invention in its broader aspects is, therefore, not limited to the specific details, representative methods and apparatuses, and illustrative example shown and described. Accordingly, alterations may be made from such details without departing from the spirit or scope of Applicant's general inventive concept.

What is claimed is:

1. A flexible layered membrane for use in separating hydrogen sulfide from a mixture of gases in a continuous flow-through process, said membrane comprising:
   a. a fine textured support layer permeable at least to hydrogen sulfide and having pores occludable by a very thin coating; and
   b. a selective permeability pellicle of cured polysulfide polymer having a separation factor favoring hydrogen sulfide adhered to a surface of said support layer and occluding the pores thereof.

2. A membrane as recited in claim 1, wherein said selective permeability pellicle comprises a polymer of bis-(ethylene oxy) methane containing disulfide linkages.

3. A membrane as recited in claim 1 or 2, wherein said selective permeability membrane contains polymer segments terminated with reactive mercaptan (—SH) groups.

4. A membrane as recited in claim 1, wherein said polymer contains branched mercaptan groups to control modulus and elongation.

5. A membrane as recited in claim 1, wherein prior to curing said polymer has a predetermined proportion of branched chains for producing crosslinking.

6. A membrane as recited in claim 1, wherein prior to curing said polymer has an average molecular weight in a range of 8000 to 9000.

7. A membrane as recited in claim 3, wherein said polymer contains branched mercaptan groups to control modulus and elongation.

8. A membrane as recited in claim 3, wherein prior to curing said polymer has a predetermined proportion of branched chains for producing crosslinking.

9. A membrane as recited in claim 3, wherein prior to curing said polymer has an average molecular weight in a range 1000 to 9000.

10. A membrane as recited in claim 1, wherein said support layer is microporous.

11. A membrane as recited in claim 1, wherein said support layer comprises expanded polytetrafluoroethylene.

12. A membrane as recited in claim 1, wherein said support layer comprises microporous polypropylene.

13. Apparatus for removing hydrogen sulfide from a mixture of gases, comprising:
   a. a flexible layered membrane including:
      (i) a fine textured support layer permeable at least to hydrogen sulfide gas and having pores occludable by a very thin coating; and
      (ii) a selective permeability pellicle of cured polysulfide polymer having a separation factor favoring hydrogen sulfide adhered to a surface of said support layer occluding the pores thereof;
   b. means for conducting said mixture of gases under pressure along one surface of said layered membrane; and
   c. means for removing gas emerging from the surface of said layered membrane opposite said one surface thereof.

14. Apparatus for removing hydrogen sulfide from a mixture of gases including methane, said apparatus comprising:
   a. a flexible layered membrane including:
      (i) a fine textured support layer permeable at least to hydrogen sulfide gas and having pores occludable by a very thin coating; and
      (ii) a selective permeability pellicle of cured polysulfide polymer adhered to a surface of said support layer occluding the pores thereof and having a permeability for hydrogen sulfide at least thirty times that for methane;

b. means for conducting said mixture of gases under pressure along one surface of said layered membrane; and c. means for removing gas emerging from the surface of said layered membrane opposite said one surface thereof.

15. Apparatus as recited in claim 13 or 14, wherein:

a. said conducting means introduces said mixture of gases along a surface of said selective permeability pellicle; and b. said removing means draws off gases emerging from said fine textured layer.

* * * * *